US012680040B2

(12) United States Patent
Jiang et al.

(10) Patent No.: US 12,680,040 B2
(45) Date of Patent: *Jul. 14, 2026

(54) METHOD FOR PRETREATING WASTE FAT, OIL AND GREASE AND CO-PRODUCING FIRST-GENERATION BIODIESEL

(71) Applicant: Fuzhou University, Fuzhou (CN)

(72) Inventors: Lilong Jiang, Fuzhou (CN); Kuan Huang, Fuzhou (CN); Zhenping Cai, Fuzhou (CN); Yanning Cao, Fuzhou (CN); Yongde Ma, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 30 days.

This patent is subject to a terminal disclaimer.

(21) Appl. No.: 18/788,356

(22) Filed: Jul. 30, 2024

(65) Prior Publication Data

US 2025/0207049 A1 Jun. 26, 2025

(30) Foreign Application Priority Data

Dec. 21, 2023 (CN) ........................ 202311785076.5

(51) Int. Cl.

*C10L 1/02* (2006.01)
*C11B 3/00* (2006.01)
*C11B 3/04* (2006.01)

(52) U.S. Cl.

CPC .............. *C10L 1/026* (2013.01); *C11B 3/008* (2013.01); *C11B 3/04* (2013.01); *C10L 2200/0476* (2013.01); *C10L 2270/026* (2013.01); *C10L 2290/547* (2013.01)

(58) Field of Classification Search

CPC .... C11B 3/008; C11B 3/04; C10L 2200/0476; C10L 2270/026; C10L 2290/547; C10L 1/026

See application file for complete search history.

(56) References Cited

FOREIGN PATENT DOCUMENTS

| | | | | | |
|---|---|---|---|---|---|
| CN | 1810761 | A | * | 8/2006 | |
| CN | 112592766 | A | * | 4/2021 | ............. C11B 13/00 |
| CN | 114574233 | A | * | 6/2022 | ............... C11C 3/04 |

* cited by examiner

*Primary Examiner* — Latosha Hines
(74) *Attorney, Agent, or Firm* — Oliff PLC

(57) ABSTRACT

Provided is a method for pretreating waste fat, oil and grease (FOG) and co-producing a first-generation biodiesel, including: S1, feeding waste FOG, a liquid acid catalyst, and methanol into a pre-esterification reactor, and conducting pre-esterification to obtain a pre-esterification mixed liquid; S2, removing waste residues from the pre-esterification mixed liquid through a filter to obtain a filtrate, and separating the filtrate by a liquid-liquid separator to obtain an organic phase and an aqueous phase; S3, introducing the organic phase into a methanol recovery tower I and conducting separation to obtain a pre-esterification product and crude methanol; introducing the aqueous phase into a methanol recovery tower II and conducting another separation to obtain a liquid acid catalyst and crude methanol; S4, separating the pre-esterification product through a biodiesel refining tower to obtain a first-generation biodiesel product, and a pretreated waste FOG at a tower bottom.

10 Claims, 1 Drawing Sheet

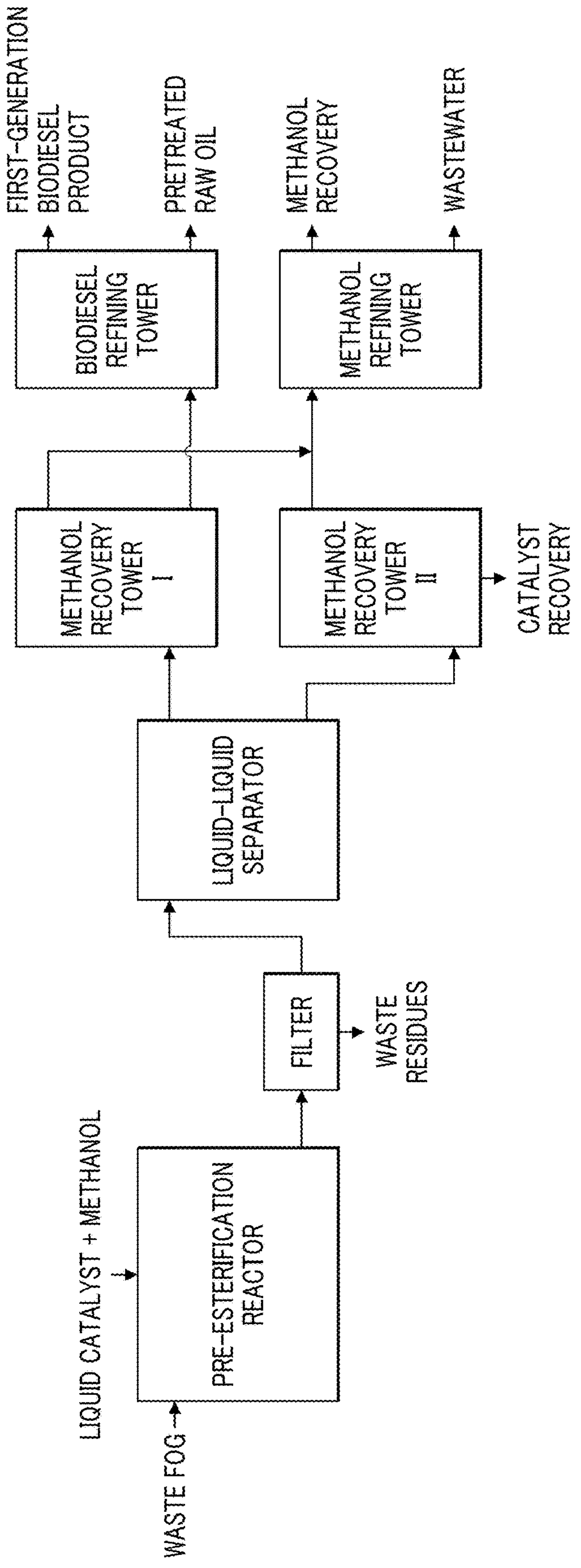
WASTE FOG
LIQUID CATALYST + METHANOL
PRE-ESTERIFICATION REACTOR
FILTER
WASTE RESIDUES
LIQUID-LIQUID SEPARATOR
METHANOL RECOVERY TOWER I
METHANOL RECOVERY TOWER II
CATALYST RECOVERY
BIODIESEL REFINING TOWER
METHANOL REFINING TOWER
FIRST-GENERATION BIODIESEL PRODUCT
PRETREATED RAW OIL
METHANOL RECOVERY
WASTEWATER

METHOD FOR PRETREATING WASTE FAT, OIL AND GREASE AND CO-PRODUCING FIRST-GENERATION BIODIESEL

CROSS REFERENCE TO RELATED APPLICATION

This patent application claims the benefit and priority of Chinese Patent Application No. 202311785076.5, entitled "Method for pretreating waste fat, oil and grease and co-producing first-generation biodiesel" filed with the China National Intellectual Property Administration on Dec. 21, 2023, the disclosure of which is incorporated by reference herein in its entirety as part of the present application.

TECHNICAL FIELD

The present disclosure relates to the technical field of catalytic conversion of bio-fat, oil and grease, and specifically relates to a method for pretreating waste fat, oil and grease (FOG) and co-producing a first-generation biodiesel.

BACKGROUND ART

In the existing production process of first-generation biodiesel, inorganic acids such as concentrated sulfuric acid and hydrochloric acid are traditionally used as acid catalysts, which not only causes difficulties in recovering liquid acid catalysts, but also seriously corrodes equipment. In addition, the post-treatment of a transesterification reaction requires a large amount of water for deep washing, which generates a large amount of waste alkaline liquid, resulting in the loss of raw materials and environment pollution caused by waste discharge. Further, the operation is cumbersome, time-consuming, low-efficiency, and high-cost. Although interest in biodiesel has grown rapidly, its synthesis process has remained essentially unchanged in recent years. In terms of the hydrodeoxygenation of waste FOG raw materials to prepare biodiesel, due to the high content of free fatty acids and high acid value in the waste FOG, as well as the presence of a large amount of impurities such as water, metal ions, phospholipids and unsaponifiable substances, the activity and stability of the catalyst are seriously affected during the hydrodeoxygenation process, which causes the catalyst bed to be easily pulverized and deactivated and thus results in frequent shutdown of the devices to replace the catalyst. Therefore, the operation cannot run stably for a long period, and has a high operating cost and a low economic benefit. As for existing methods for pretreating waste FOG, conventional methods such as water washing, acid washing, alkali washing, and adsorption are generally used. Although some impurities can be removed, the overall efficiency is low and the operating cost is high.

SUMMARY

The present disclosure aims to solve the problems of cumbersome production process for the first-generation biodiesel and low efficiency of waste FOG pretreatment in the prior art, and provides a new method for pretreating waste FOG and co-producing a first-generation biodiesel, which allows composite liquid acid to be used as a pre-esterification catalyst, achieves high-efficient recycle of the liquid acid catalyst and reduces corrosion to the equipment. Meanwhile, the acid value and impurities of the waste FOG are effectively reduced, the co-production of first-generation biodiesel products is achieved through separation, and the process is efficient and stable.

The present disclosure provides the following technical solutions:

Provided is a method for pretreating waste fat, oil and grease (FOG) and co-producing a first-generation biodiesel, including:

S1, feeding waste FOG, a liquid acid catalyst, and methanol at a certain proportion into a pre-esterification reactor, and conducting pre-esterification reaction to obtain a pre-esterification mixed liquid;

S2, removing waste residues from the pre-esterification mixed liquid after the pre-esterification reaction through a filter to obtain a filtrate, and separating the filtrate by a liquid-liquid separator to obtain an organic phase and an aqueous phase;

S3, introducing the organic phase after the pre-esterification reaction into a methanol recovery tower I and conducting separation to obtain a pre-esterification product and crude methanol; introducing the aqueous phase into a methanol recovery tower II and conducting another separation to obtain a liquid acid catalyst and crude methanol; and S4, separating the pre-esterification product through a biodiesel refining tower to obtain a first-generation biodiesel product, and a pretreated waste FOG at a tower bottom; and purifying the crude methanol through a methanol refining tower.

In some embodiments, the waste FOG in step S1 includes one selected from the group consisting of acidified oil, hogwash oil, and swill-cooked dirty oil or a mixture thereof.

In some embodiments, in step S1, the liquid acid catalyst is a mixture of an inorganic acid and an acidic ionic liquid; the inorganic acid includes one or more selected from the group consisting of concentrated sulfuric acid, phosphoric acid, and hydrochloric acid; the acidic ionic liquid includes one or more selected from the group consisting of an imidazolium hydrogensulfate ionic liquid, a N-alkylammonium hydrogensulfate ionic liquid, a pyridinium hydrogensulfate ionic liquid, and a pyrrole hydrogensulfate ionic liquid; and a molar ratio of the inorganic acid to the acidic ionic liquid is in a range of (0.1-0.5):1.

In some embodiments, in step S1, a molar ratio of the waste FOG to the methanol is in a range of (1-10):1, and a molar ratio of the liquid acid catalyst to the waste FOG is in a range of (0.01-0.1):1.

In some embodiments, in step S1, the pre-esterification reaction is conducted at a temperature of 60° C. to 120° C. and a pressure of 0.1 MPa to 1 MPa for 1 h to 10 h.

In some embodiments, in step S2, the filter is used for removing solid waste residues in the mixed liquid at an operating temperature of 50° C. to 80° C.

In some embodiments, in step S2, the liquid-liquid separator is a chromatography device with an operating temperature of 50° C. to 80° C. and operating time of 0.5 h to 2.0 h.

In some embodiments, in step S3, both the methanol recovery tower I and the methanol recovery tower II have an operating temperature of 60° C. to 100° C., and an operating pressure of 0.1 MPa to 1.0 MPa.

In some embodiments, the methanol refining tower in step S3 is a normal-pressure fractionation tower with an operating temperature of 67° C. to 75° C. and an operating pressure of 0.1 MPa to 0.2 MPa at a tower top.

In some embodiments, the liquid acid catalyst and methanol separated in step S3 may be reused.

In some embodiments, in step S4, the biodiesel refining tower is a reduced-pressure fractionation tower with an operating temperature of 100° C. to 250° C. and an operating pressure of 0.5 kPa to 2.0 kPa at a tower top.

Some embodiments of the present disclosure have the following advantages:

A. The method according to the present disclosure is reliable, has strong adaptability to raw materials, and could be used to treat various waste FOG with poor quality and co-produce high-quality first-generation biodiesel.

B. The process route of the method according to the present disclosure makes it possible to achieve a one-step process for preparing a first-generation biodiesel, avoid the use of alkaline catalysts, and effectively reduce the formation of a large amount of alkaline waste liquid. In addition, the process has a low cost and greatly reduces the acid value of the waste FOG.

C. The method according to the present disclosure has a desirable pre-esterification efficiency, reaching 90% or more.

BRIEF DESCRIPTION OF THE DRAWINGS

In order to illustrate the specific embodiments of the present disclosure more clearly, the drawing needed to be used in the specific embodiments will be briefly introduced below. Obviously, the drawing in the following description is some embodiments of the present disclosure, and other drawings could be obtained by those skilled in the art without creative effort according to the drawing.

FIGURE is a flow chart showing a method for pretreating waste FOG and co-producing a first-generation biodiesel according to an embodiment of the present disclosure.

DETAILED DESCRIPTION OF THE EMBODIMENTS

The technical solution of the present disclosure will be clearly and completely described below with reference to the accompanying drawings. Obviously, the described examples are some, not all, of the embodiments in the present disclosure. Based on the examples of the present disclosure, all other embodiments obtained by those skilled in the art without creative effort shall fall within the scope of the present disclosure.

Example 1

As shown in FIGURE, a method for pretreating waste FOG and co-producing a first-generation biodiesel was conducted as follows:

S1. Waste FOG and methanol at a molar ratio of alcohol to oil of 10:1 were fed into a pre-esterification reactor; and a composite acid catalyst (in which a ratio of 98% concentrated sulfuric acid to 1-butyl-3-methylimidazolium hydrogensulfate acidic ionic liquid was 0.1) was fed therein at a temperature of 70° C. under mechanical stirring (at a speed of 400 rpm), where the composite acid catalyst was added in a molar amount of 10% of that of the waste FOG. After that, a reaction was performed for 2 h to obtain a pre-esterification mixed liquid.

S2. The pre-esterification mixed liquid after the reaction was filtered through a filter (the temperature of the filter was set to 60° C.) to remove waste residues, and a resulting filtrate was transferred to a liquid-liquid separator (i.e., a chromatography device) and conducted separation therein to obtain an organic phase and an aqueous phase, where the temperature of the chromatography device was set to 50° C., and the separation was conducted for 1 h.

S3. The organic phase and the aqueous phase after the pre-esterification were introduced into a methanol recovery tower I and a methanol recovery tower II, respectively, and then conducted separation, so as to obtain a pre-esterification product, crude methanol and a liquid acid catalyst, and the liquid acid catalyst was recovered. The temperatures of the methanol recovery tower I and the methanol recovery tower II were set to 80° C. and 100° C. respectively, and the operating pressures of both were 0.2 MPa. The crude methanol was further purified through a methanol refining tower with an operating temperature of 75° C. and an operating pressure of 0.2 MPa.

S4. The pre-esterification product was transferred to a biodiesel refining tower and conducted fractionation therein to obtain a first-generation biodiesel product and pretreated raw oil (i.e., pretreated waste FOG), where the operating temperature at the top of the tower was 250° C. and the operating pressure was 1.0 kPa. The purity of the first-generation biodiesel and the acid value of the pretreated raw oil were measured by GC-MS and KOH titration, and the pre-esterification efficiency reaches 98%.

Example 2

A method for pretreating waste FOG and co-producing a first-generation biodiesel was conducted as follows:

S1. Waste FOG and methanol at a molar ratio of alcohol to oil of 10:1 were fed into a pre-esterification reactor; and a composite acid catalyst (in which a ratio of concentrated sulfuric acid to 1-butyl-3-methylimidazolium hydrogen sulfate acidic ionic liquid was 0.1) was fed therein at a temperature of 60° C. under mechanical stirring (at a speed of 400 rpm), where the composite acid catalyst was added in a molar amount of 10% of that of the waste FOG. After that, a reaction was performed for 1 h to obtain a pre-esterification mixed liquid.

S2. The pre-esterification mixed liquid after the reaction was filtered through a filter (the temperature of the filter was set to 50° C.) to remove waste residues, and a resulting filtrate was transferred to a chromatography device and conducted separation therein to obtain an organic phase and an aqueous phase, where the temperature of the chromatography device was set to 50° C., and the separation was conducted for 1 h.

S3. The organic phase and the aqueous phase after the pre-esterification were introduced into a methanol recovery tower I and a methanol recovery tower II, respectively, and then conducted separation, so as to obtain a pre-esterification product, crude methanol and a liquid acid catalyst, and the liquid acid catalyst was recovered. The temperatures of the methanol recovery tower I and the methanol recovery tower II were set to 80° C. and 100° C. respectively, and the operating pressures of both were 0.2 MPa. The crude methanol was further purified through a methanol refining tower with an operating temperature of 75° C. and an operating pressure of 0.1 MPa.

S4. The pre-esterification product was transferred to a biodiesel refining tower and conducted fractionation therein to obtain a first-generation biodiesel product and pretreated raw oil (i.e., pretreated waste FOG), where the operating temperature at the top of the tower was 250° C., and the operating pressure was 1.0 kPa. The purity of the first-generation biodiesel and the acid value of the pretreated raw oil were measured by GC-MS and KOH titration, and the pre-esterification efficiency reaches 93%.

Example 3

A method for pretreating waste FOG and co-producing a first-generation biodiesel was conducted as follows:

S1. Waste FOG and methanol at a molar ratio of alcohol to oil of 8:1 were fed into a pre-esterification reactor; and a composite acid catalyst (in which a ratio of concentrated sulfuric acid to 1-butyl-3-methylimidazolium hydrogensulfate acidic ionic liquid was 0.1) was fed therein at a temperature of 70° C. under mechanical stirring (at a speed of to 400 rpm), where the composite acid catalyst was added in a molar amount of 10% of that of the waste FOG. After that, a reaction was performed for 3 h to obtain a pre-esterification mixed liquid.

S2. The pre-esterification mixed liquid after the reaction was filtered through a filter (the temperature of the filter was set to 60° C.) to remove waste residues, and a resulting filtrate was transferred to a chromatography device and conducted separation therein to obtain an organic phase and an aqueous phase, where the temperature of the chromatography device was set to 60° C., and the separation was conducted for 1 h.

S3. The organic phase and the aqueous phase after the pre-esterification were introduced into a methanol recovery tower I and a methanol recovery tower II, respectively, and then conducted separation, so as to obtain a pre-esterification product, crude methanol and a liquid acid catalyst, and the liquid acid catalyst was recovered. The temperatures of the methanol recovery tower I and the methanol recovery tower II were set to 80° C. and 100° C. respectively, and the operating pressures of both were 0.2 MPa. The crude methanol was further purified through a methanol refining tower with an operating temperature of 75° C. and an operating pressure of 0.2 MPa.

S4. The pre-esterification product was transferred to a biodiesel refining tower and conducted fractionation therein to obtain a first-generation biodiesel product and pretreated raw oil (i.e., pretreated waste FOG), where the operating temperature at the top of the tower was 250° C., and the operating pressure was 1.0 kPa. The purity of the first-generation biodiesel and the acid value of the pretreated raw oil were measured by GC-MS and KOH titration, and the pre-esterification efficiency reaches 96%.

Example 4

A method for pretreating waste FOG and co-producing a first-generation biodiesel was conducted as follows:

S1. Waste FOG and methanol at a molar ratio of alcohol to oil of 5:1 were fed into a pre-esterification reactor; and a composite acid catalyst (in which a ratio of concentrated sulfuric acid to N-methylpyridinium hydrogensulfate acidic ionic liquid was 0.2) was fed therein at a temperature of 60° C. under mechanical stirring (at a speed of 400 rpm), where the composite acid catalyst was added in a molar amount of 6% of that of the waste FOG. After that, a reaction was performed for 5 h to obtain a pre-esterification mixed liquid.

S2. The pre-esterification mixed liquid after the reaction was filtered through a filter (the temperature of the filter was 65° C.) to remove waste residues, and a resulting filtrate was transferred to a chromatography device and conducted separation therein to obtain an organic phase and an aqueous phase, where the temperature of the chromatography device was set to 60° C., and the separation was conducted for 2 h.

S3. The organic phase and the aqueous phase after the pre-esterification were introduced into a methanol recovery tower I and a methanol recovery tower II, respectively, and then conducted separation, so as to obtain a pre-esterification product, crude methanol and a liquid acid catalyst, and the liquid acid catalyst was recovered. The temperatures of the methanol recovery tower I and the methanol recovery tower II were set to 100° C. and 60° C. respectively, and the operating pressures of both were 0.1 MPa. The crude methanol was further purified through a methanol refining tower with an operating temperature of 67° C. and an operating pressure of 0.1 MPa.

S4. The pre-esterification product was transferred to a biodiesel refining tower and conducted fractionation therein to obtain a first-generation biodiesel product and pretreated raw oil (i.e., pretreated waste FOG), where the operating temperature at the top of the tower was 200° C., and the operating pressure was 0.5 kPa. The purity of the first-generation biodiesel and the acid value of the pretreated raw oil were measured by GC-MS and KOH titration, and the pre-esterification efficiency reaches 92%.

Example 5

A method for pretreating waste FOG and co-producing a first-generation biodiesel was conducted as follows:

S1. Waste FOG and methanol at a molar ratio of alcohol to oil of 5:1 were fed into a pre-esterification reactor; and a composite acid catalyst (in which a ratio of concentrated sulfuric acid to N-ethyl-N-methylpyrrole hydrogensulfate acidic ionic liquid was 0.3) was fed therein at a temperature of 100° C. under mechanical stirring (at a speed of 400 rpm), where the composite acid catalyst was added in a molar amount of 5% of that of the waste FOG. After that, a reaction was performed for 2 h to obtain a pre-esterification mixed liquid.

S2. The pre-esterification mixed liquid after the reaction was filtered through a filter (the temperature of the filter was set to 65° C.) to remove waste residues, and a resulting filtrate was transferred to a chromatography device and conducted separation therein to obtain an organic phase and an aqueous phase, where the temperature of the chromatography device was set to 80° C., and the separation was conducted for 2 h.

S3. The organic phase and the aqueous phase after the pre-esterification were introduced into a methanol recovery tower I and a methanol recovery tower II, respectively, and then conducted separation, so as to obtain a pre-esterification product, crude methanol and a liquid acid catalyst, and the liquid acid catalyst was recovered. The temperatures of the methanol recovery tower I and the methanol recovery tower II were set to 80° C. and 100° C. respectively, and the operating pressures of both were 0.1 MPa. The crude methanol was further purified through a methanol refining tower with an operating temperature of 75° C. and an operating pressure of 0.1 MPa.

S4. The pre-esterification product was transferred to a biodiesel refining tower and conducted fractionation therein to obtain a first-generation biodiesel product and pretreated raw oil (i.e., pretreated waste FOG), where the operating temperature at the top of the tower was 200° C., and the operating pressure was 1.0 kPa. The purity of the first-generation biodiesel and the acid value of the pretreated raw oil were measured by GC-MS and KOH titration, and the pre-esterification efficiency reaches 95%.

Example 6

A method for pretreating waste FOG and co-producing a first-generation biodiesel was conducted as follows.

S1. Waste FOG and methanol at a molar ratio of alcohol to oil of 2:1 were fed into a pre-esterification reactor; and a composite acid catalyst (in which a ratio of concentrated phosphoric acid to methyltributylammonium hydrogensulfate acidic ionic liquid was 0.1) was fed therein at a temperature of 120° C. under mechanical stirring (at a speed of 400 rpm), where the composite acid catalyst was added in a molar amount of 5% of that of the waste FOG. After that, a reaction was performed for 7 h to obtain a pre-esterification mixed liquid.

S2. The pre-esterification mixed liquid after the reaction was filtered by using a filter (the temperature of the filter was set to 80° C.) to remove waste residues, and a resulting filtrate was transferred to a chromatography device and conducted separation therein to obtain an organic phase and an aqueous phase, where the temperature of the chromatography device was set to 60° C., and the separation was conducted for 0.5 h.

S3. The organic phase and the aqueous phase after the pre-esterification were introduced into a methanol recovery tower I and a methanol recovery tower II, respectively, and then conducted separation, so as to obtain a pre-esterification product, crude methanol and a liquid acid catalyst, and the liquid acid catalyst was recovered. The temperatures of the methanol recovery tower I and the methanol recovery tower II were set to 60° C. and 80° C. respectively, and the operating pressures of both were 0.1 MPa. The crude methanol was further purified through a methanol refining tower with an operating temperature of 70° C. and an operating pressure of 0.1 MPa.

S4. The pre-esterification product was transferred to a biodiesel refining tower and conducted fractionation therein to obtain a first-generation biodiesel product and pretreated raw oil (i.e., pretreated waste FOG), where the operating temperature at the top of the tower was 150° C., and the operating pressure was 2.0 kPa. The purity of the first-generation biodiesel and the acid value of the pretreated raw oil were measured by GC-MS and KOH titration, and the pre-esterification efficiency reaches 91%.

Example 7

A method for pretreating waste FOG and co-producing a first-generation biodiesel was conducted as follows:

S1. Waste FOG and methanol at a molar ratio of alcohol to oil of 1:1 were fed into a pre-esterification reactor; and a composite acid catalyst (in which a ratio of concentrated sulfuric acid to 1-butyl-3-methylimidazolium hydrogensulfate acidic ionic liquid was 0.5) was fed therein at a temperature of 70° C. under mechanical stirring (at a speed of 400 rpm), where the composite acid catalyst was added in a molar amount of 5% of that of the waste FOG. After that, a reaction was performed for 5 h to obtain a pre-esterification mixed liquid.

S2. The pre-esterification mixed liquid after the reaction was filtered through a filter (the temperature of the filter was set to 60° C.) to remove waste residues, and a resulting filtrate was transferred to a chromatography device and conducted separation therein to obtain an organic phase and an aqueous phase, where the temperature of the chromatography device was set to 60° C., and the separation was conducted for 1.5 h.

S3. The organic phase and the aqueous phase after the pre-esterification were introduced into a methanol recovery tower I and a methanol recovery tower II. Respectively, and then conducted separation, so as to obtain a pre-esterification product, crude methanol and a liquid acid catalyst, and the liquid acid catalyst was recovered. The temperatures of the methanol recovery tower I and the methanol recovery tower II were set to 80° C. and 100° C. respectively, and the operating pressures of both were 0.5 MPa. The crude methanol was further purified through a methanol refining tower with an operating temperature of 75° C. and an operating pressure of 0.1 MPa.

S4. The pre-esterification product was transferred to a biodiesel refining tower and conducted fractionation therein to obtain a first-generation biodiesel product and pretreated raw oil (i.e., pretreated waste FOG), where the operating temperature at the top of the tower was 250° C., and the operating pressure was 1.0 kPa. The purity of the first-generation biodiesel and the acid value of the pretreated raw oil were measured by GC-MS and KOH titration, and the pre-esterification efficiency reaches 98%.

Example 8

A method for pretreating waste FOG and co-producing a first-generation biodiesel was conducted as follows:

S1. Waste FOG and methanol at a molar ratio of alcohol to oil of 4:1 were fed into a pre-esterification reactor; and a composite acid catalyst (in which a ratio of concentrated sulfuric acid to 1-butyl-3-methylimidazolium hydrogensulfate acidic ionic liquid was 0.1) was fed therein at a temperature of 80° C. under mechanical stirring (at a speed of 400 rpm), where the composite acid catalyst was added in a molar amount of 1% of that of the waste FOG. After that, a reaction was performed for 1 h to obtain a pre-esterification mixed liquid.

S2. The pre-esterification mixed liquid after the reaction was filtered through a filter (the temperature of the filter was set to 65° C.) to remove waste residues, and a resulting filtrate was transferred to a chromatography device and conducted separation therein to obtain an organic phase and an aqueous phase, where the temperature of the chromatography device was set to 65° C., and the separation was conducted for 2 h.

S3. The organic phase and the aqueous phase after the pre-esterification were introduced into a methanol recovery tower I and a methanol recovery tower II, respectively, and then conducted separation, so as to obtain a pre-esterification product, crude methanol and a liquid acid catalyst, and the liquid acid catalyst was recovered. The temperatures of the methanol recovery tower I and the methanol recovery tower II were set to 70° C. and 70° C. respectively, and the operating pressures of both were 0.2 MPa. The crude methanol was further purified through a methanol refining tower with an operating temperature of 67° C. and an operating pressure of 0.2 MPa.

S4. The pre-esterification product was transferred to a biodiesel refining tower and conducted fractionation therein to obtain a first-generation biodiesel product and pretreated raw oil (i.e., pretreated waste FOG), where the operating temperature at the top of the tower was 100° C., and the operating pressure was 2.0 kPa. The purity of the first-generation biodiesel and the acid value of the pretreated raw oil were measured by GC-MS and KOH titration, and the pre-esterification efficiency reaches 90%.

Example 9

A method for pretreating waste FOG and co-producing a first-generation biodiesel was conducted as follows:

S1. Waste FOG and methanol at a molar ratio of alcohol to oil of 4:1 were fed into a pre-esterification; and a composite acid catalyst (in which a ratio of concentrated sulfuric acid to 1-butyl-3-methylimidazolium hydrogensulfate acidic ionic liquid was 0.1) was fed therein at a temperature of 110° C. under mechanical stirring (at a speed of 400 rpm), where the composite acid catalyst was added in a molar amount of 2% of that of the waste FOG. After that, a reaction was performed for 3 h to obtain a pre-esterification mixed liquid.

S2. The pre-esterification mixed liquid after the reaction was filtered through a filter (the temperature of the filter was set to 65° C.) to remove waste residues, and a resulting filtrate was transferred to a chromatography device and conducted separation therein to obtain an organic phase and an aqueous phase, where the temperature of the chromatography device was set to 60° C., and the separation was conducted for 1 h.

S3. The organic phase and the aqueous phase after the pre-esterification were introduced into a methanol recovery tower I and a methanol recovery tower II, respectively, and then conducted separation, so as to obtain a pre-esterification product, crude methanol and a liquid acid catalyst, and the liquid acid catalyst was recovered. The temperatures of the methanol recovery tower I and the methanol recovery tower II were set to 80° C. and 100° C. respectively, and the operating pressures of both were 1 MPa. The crude methanol was further purified through a methanol refining tower with an operating temperature of 75° C. and an operating pressure of 0.2 MPa.

S4. The pre-esterification product was transferred to a biodiesel refining tower and conducted fractionation therein to obtain a first-generation biodiesel product and pretreated raw oil (i.e., pretreated waste FOG), where the operating temperature at the top of the tower was 200° C., and the operating pressure was 1.5 kPa. The purity of the first-generation biodiesel and the acid value of the pretreated raw oil were measured by GC-MS and KOH titration, and the pre-esterification efficiency reaches 90%.

Example 10

A method for pretreating waste FOG and co-producing a first-generation biodiesel was conducted as follows:

S1. Waste FOG and methanol at a molar ratio of alcohol to oil of 2:1 were fed into a pre-esterification reactor; and a composite acid catalyst (in which a ratio of concentrated sulfuric acid to 1-butyl-3-methylimidazolium hydrogensulfate acidic ionic liquid was 0.1) was fed therein at a temperature of 70° C. under mechanical stirring (at a speed of 400 rpm), where the composite acid catalyst was added in a molar amount of 1% of that of the waste FOG. After that, a reaction was performed for 10 h to obtain a pre-esterification mixed liquid.

S2. The pre-esterification mixed liquid after the reaction was filtered through a filter (the temperature of the filter was set to 80° C.) to remove waste residues, and a resulting filtrate was transferred to a chromatography device and conducted separation therein to obtain an organic phase and an aqueous phase, where the temperature of the chromatography device was set to 60° C., and the separation was conducted for 2 h.

S3. The organic phase and the aqueous phase after the pre-esterification were introduced into a methanol recovery tower I and a methanol recovery tower II, respectively, and then conducted separation, so as to obtain a pre-esterification product, crude methanol and a liquid acid catalyst, and the liquid acid catalyst was recovered. The temperatures of the methanol recovery tower I and the methanol recovery tower II were set to 100° C. and 100° C. respectively, and the operating pressures of both were 0.2 MPa. The crude methanol was further purified through a methanol refining tower with an operating temperature of 70° C. and an operating pressure of 0.2 MPa.

S4. The pre-esterification product was transferred to a biodiesel refining tower and conducted fractionation therein to obtain a first-generation biodiesel product and pretreated raw oil (i.e., pretreated waste FOG), where the operating temperature at the top of the tower was 250° C., and the operating pressure was 0.5 kPa. The purity of the first-generation biodiesel and the acid value of the pretreated raw oil were measured by GC-MS and KOH titration, and the pre-esterification efficiency reaches 92%.

Obviously, the above-described embodiments are only examples for clear illustration and are not intended to limit the embodiments. For those skilled in the art, other different forms of changes or modifications can be made based on the above description. An exhaustive list of all embodiments is neither necessary nor possible. The obvious changes or modifications derived therefrom are still within the scope of the present disclosure.

The invention claimed is:

1. A method for pretreating waste fat, oil and grease (FOG) and co-producing a first-generation biodiesel, comprising:

S1, feeding waste FOG, a liquid acid catalyst, and methanol at a certain proportion into a pre-esterification reactor, and conducting pre-esterification reaction to obtain a pre-esterification mixed liquid;

S2, removing waste residues from the pre-esterification mixed liquid after the pre-esterification reaction through a filter to obtain a filtrate, and separating the filtrate by a liquid-liquid separator to obtain an organic phase and an aqueous phase;

S3, introducing the organic phase after the pre-esterification reaction into a methanol recovery tower I and conducting separation to obtain a pre-esterification product and crude methanol; introducing the aqueous phase into a methanol recovery tower II and conducting another separation to obtain a liquid acid catalyst and crude methanol; and purifying the crude methanol through a methanol refining tower; and S4, separating the pre-esterification product through a biodiesel refining tower to obtain a first-generation biodiesel product, and a pretreated waste FOG at a tower bottom.

2. The method for pretreating the waste FOG and co-producing the first-generation biodiesel according to claim 1, wherein the waste FOG in step S1 comprises one selected from the group consisting of acidified oil, hogwash oil, and swill-cooked dirty oil or a mixture thereof.

3. The method for pretreating the waste FOG and co-producing the first-generation biodiesel according to claim 1, wherein in step S1, the liquid acid catalyst is a mixture of an inorganic acid and an acidic ionic liquid;

the inorganic acid comprises one or more selected from the group consisting of concentrated sulfuric acid, phosphoric acid, and hydrochloric acid;

the acidic ionic liquid comprises one or more selected from the group consisting of an imidazolium hydrogensulfate ionic liquid, a N-alkylammonium hydrogensulfate ionic liquid, a pyridinium hydrogensulfate ionic liquid and a pyrrole hydrogensulfate ionic liquid; and a molar ratio of the inorganic acid to the acidic ionic liquid is in a range of (0.1-0.5):1.

4. The method for pretreating the waste FOG and co-producing the first-generation biodiesel according to claim 1, wherein in step S1, a molar ratio of the waste FOG to the methanol is in a range of (1-10):1, and a molar ratio of the liquid acid catalyst to the waste FOG is in a range of (0.01-0.1):1.

5. The method for pretreating the waste FOG and co-producing the first-generation biodiesel according to claim 1, wherein in step S1, the pre-esterification reaction is conducted at a temperature of 60° C. to 120° C. and a pressure of 0.1 MPa to 1 MPa for 1 h to 10 h.

6. The method for pretreating the waste FOG and co-producing the first-generation biodiesel according to claim 1, wherein in step S2, an operating temperature of the filter is in a range of 50° C. to 80° C.

7. The method for pretreating the waste FOG and co-producing the first-generation biodiesel according to claim 1, wherein in step S2, the liquid-liquid separator is a chromatography device with an operating temperature of 50° C. to 80° C. and an operating time of 0.5 h to 2.0 h.

8. The method for pretreating the waste FOG and co-producing the first-generation biodiesel according to claim 1, wherein in step S3, both the methanol recovery tower I and the methanol recovery tower II have an operating temperature of 60° C. to 100° C., and an operating pressure of 0.1 MPa to 1.0 MPa.

9. The method for pretreating the waste FOG and co-producing the first-generation biodiesel according to claim 1, wherein the methanol refining tower in step S3 is a normal-pressure fractionation tower with an operating temperature of 67° C. to 75° C. and an operating pressure of 0.1 MPa to 0.2 MP at a tower top.

10. The method for pretreating the waste FOG and co-producing the first-generation biodiesel according to claim 1, wherein in step S4, the biodiesel refining tower is a reduced-pressure fractionation tower with an operating temperature of 100° C. to 250° C. and an operating pressure of 0.5 kPa to 2.0 kPa at a tower top.

* * * * *